United States Patent [19]

Evans

[11] Patent Number: 4,570,888

[45] Date of Patent: Feb. 18, 1986

[54] FASTENER FOR HOLDING AN OBJECT TO THE SIDE OF A DRYER

[76] Inventor: Warren E. Evans, R.R. #1, Box 74, Lawrenceburg, Ind. 47025

[21] Appl. No.: 537,101

[22] Filed: Sep. 29, 1983

[51] Int. Cl.⁴ ............................................. A47B 96/06
[52] U.S. Cl. ................................ 248/205.1; 248/231.9
[58] Field of Search ............ 248/205.1, 359 B, 359 R, 248/221.3, 221.4, 73, 225.1, 231.9; 411/511, 512; 24/662; 242/55.2

[56] References Cited

U.S. PATENT DOCUMENTS

| | | | |
|---|---|---|---|
| 1,209,184 | 12/1916 | Markwell . | |
| 1,794,817 | 3/1931 | Zitko . | |
| 2,064,087 | 12/1936 | Smith | 248/205.1 |
| 3,154,281 | 10/1964 | Frank . | |
| 3,157,370 | 11/1964 | Govatsos et al. | 242/55.2 |
| 3,208,701 | 9/1965 | Erickson | 248/221.3 X |
| 3,482,810 | 12/1969 | Bailey | 5/503 X |
| 3,666,225 | 5/1972 | Weinberger . | |
| 3,799,466 | 3/1974 | Adams | 242/55.2 |
| 4,105,168 | 8/1978 | Rutherford | 242/55.2 |
| 4,318,208 | 3/1982 | Borja et al. | 411/511 X |
| 4,461,442 | 7/1984 | Keenan | 5/503 X |

*Primary Examiner*—J. Franklin Foss
*Attorney, Agent, or Firm*—Wood, Herron & Evans

[57] ABSTRACT

A fastener for holding or attaching an object to the side of an appliance, such as a dryer. The fastener is a barbed plate permanently affixed to the object to be held. The barbed plate is adapted to slide in between the top and side walls of the appliance in an elongated opening or crack in the appliance. The barbed plate is semi-rigid, and the barbs are resilient, flexing to permit the plate to pass through the crack in the appliance and resilient, flexing back and preventing the plate from being pulled out from the appliance. The object being held is preferably a holder for a roll of sheets of fabric softener or a roll of paper towels. Other objects could be held such as a shelf or the like as desired.

5 Claims, 3 Drawing Figures

U.S. Patent  Feb. 18, 1986  4,570,888
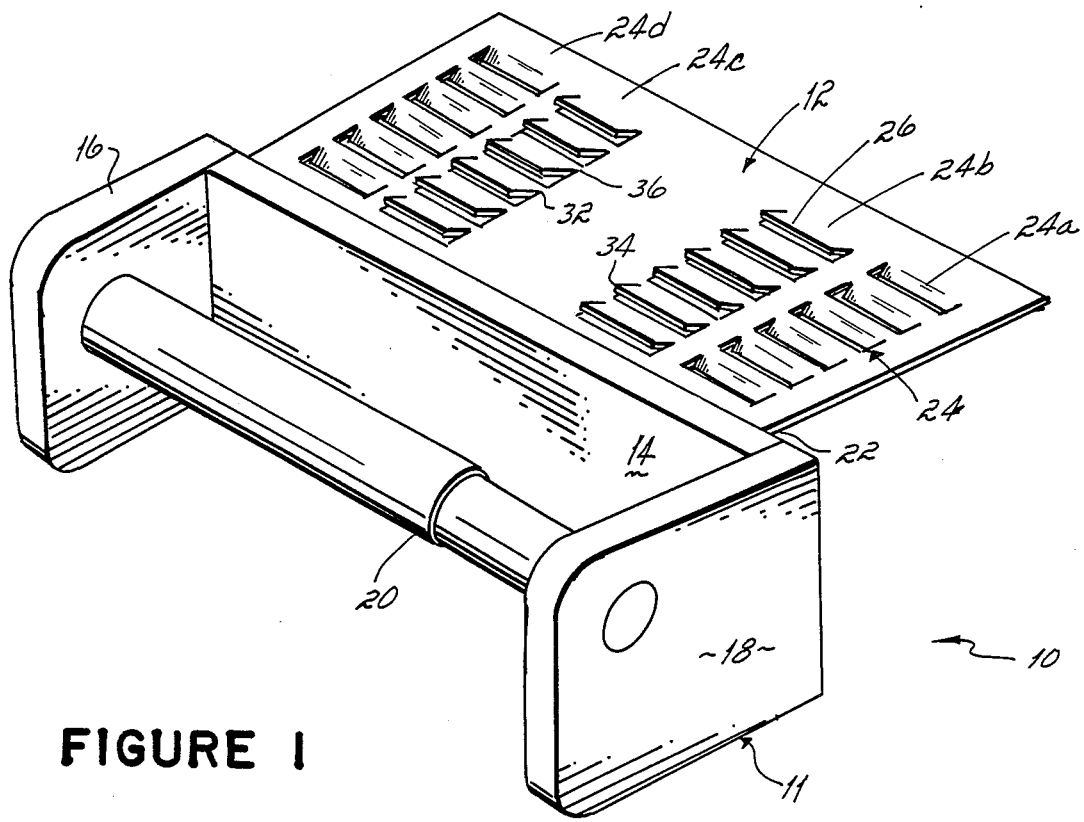
FIGURE 1
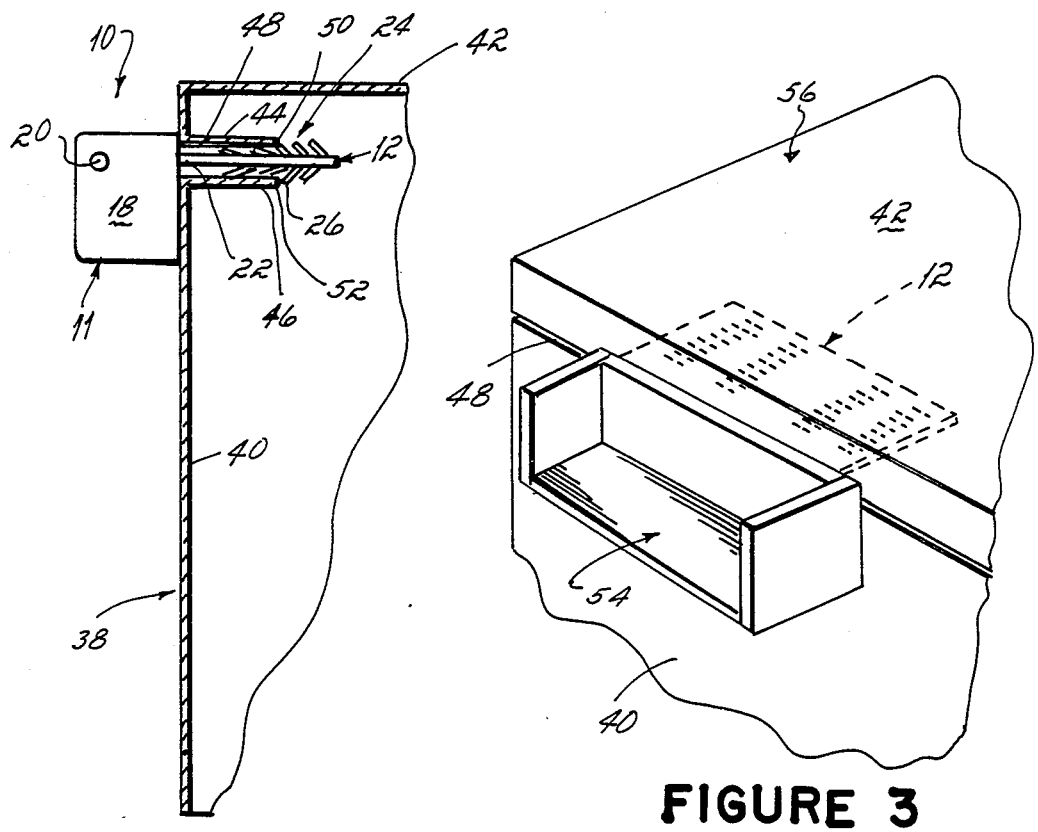
FIGURE 2
FIGURE 3

FASTENER FOR HOLDING AN OBJECT TO THE SIDE OF A DRYER

BACKGROUND

Many major appliances, such as clothes dryers, have a side wall and a top with a slight opening or crack between the side wall and the top. There are many other objects in the home, such as metal kitchen cabinets, which also have a thin elongated opening.

On many occasions, it is desirable to attach something to the side wall of an appliance, such as a washer, dryer or metal cabinet. Since they are metal, and generally porcelain-coated metal, it is undesirable to drill holes through the metal walls. The crack between the top and the side wall is very small and does not provide a sufficient opening for a screw or other types of fastener. Accordingly, up until now, no one has appreciated that this crack or any thin elongated opening could be used to attach an object.

SUMMARY OF THE INVENTION

The present invention is premised upon the realization that a fastener can be made adapted particularly to attach an object to the side of an appliance, the fastener sliding in the seam between the top and side wall of the appliance. Further, the particular fastener can be easily and inexpensively manufactured and can be made to facilitate attaching various objects to the side of various appliances.

The invention and its advantages will be appreciated from the following detailed description and drawings in which:

BRIEF DESCRIPTION OF THE DRAWINGS

FIG. 1 is a perspective view of the present invention;

FIG. 2 is a cross section of the present invention attached to the side of a dryer; and FIG. 3 is a perspective view of an alternate embodiment of the present invention.

DETAILED DESCRIPTION

As shown in FIGS. 1 and 2, there is a holder 10 for attaching a roll of material to the side of an appliance. The holder 10 includes a towel holder 11 and a securing plate 12. The towel holder 11 is of typical design including a back wall 14, two side walls 16 and 18 and a telescoping rod 20 which extends from side wall 16 to side wall 18. The telescoping rod 20 is adapted to support a roll of material, for example, a roll of paper towels or a roll of fabric softener sheets (not shown).

A first edge 22 of the securing plate 12 is permanently fixed to the back wall 14 of the towel holder 11. The plate 12 can be attached to back wall 14 by various known means, for example, gluing, nailing or molding the securing plate 12 as part of the back wall 14.

The securing plate 12 is a thin web of a strong, but resilient, material, such as, for example, one eighth inch polyvinyl chloride or polypropylene. The plate 12 further includes a plurality of columns 24 of barbs 26.

Each barb 26 includes a leading portion 32 which secures it to the securing plate 12. The individual barbs extend away from the securing plates at approximately a 45 degree angle relative to the plate 12 with a rearward edge 34 of each barb extending about one quarter of an inch away from the plate. Each column 24 of barbs includes a plurality of barbs, each spaced slightly forward from the next barb with a slight space or area 36 between each barb 26.

As shown in the figures, there are four columns 24a–24d of barbs 26. All of the barbs in a column extend in one direction from the plate. For example, the barbs 26 in column 24a all extend downwardly. The barbs in columns 24b and 24c all extend upwardly, and the barbs in column 24d extend downwardly. Each barb in a column is preferably aligned with a barb in each of the other three columns.

The present invention is particularly adapted to attach the towel holder or similar object to the side of an appliance, such as a dryer. As shown more particularly in FIG. 2, a dryer 38 includes a side wall 40 and a top 42. The top and side join together at inwardly extending lips 44 and 46, respectively. Between the respective lips is a slight elongated opening or crack 48. The securing plate 12 is thin enough to slide in between the lips 44 and 46 through crack 48. The individual barbs being resilient flex towards the plate, permitting the plate to pass through the crack. Once the individual barbs extend beyond interior edges 50 and 52 of lips 44 and 46, they flex outwardly again, preventing the plate from being pulled out from the crack 48. Accordingly, once inserted, the plate permanently attaches the towel holder to the side of the dryer.

The securing plate primarily must be thin enough to fit through the desired or provided crack. Further, it should be wide enough to provide area for multiple columns of barbs and long enough so that a barb in each column extends through the crack and flexes outwardly again.

Further, the object held to the side of the appliance can vary. For example, in FIG. 3, there is shown an alternate embodiment of the present invention wherein the securing plate 12 secures a shelf 54 to the side of a dryer 56. Accordingly, the present invention is not limited merely to holding a roll of material to the side of a dryer although this is the preferred embodiment. Accordingly, in light of the foregoing, applicant intends to be bound only by the claims in which,

I claim:

1. A bracket for attaching an article to the side of an object through an elongated opening in said object comprising
   a thin elongated plate adapted to slide within said elongated opening
   first means to attach said plate to said article
   said plate including a plurality of barbs, said barbs spaced along said plate at a plurality of different distances from said first means, said barbs having a first edge attached to said plate and a second edge extending away from said plate,
   said barbs being flexible and resilient;
   whereby said plate is attached to said object by inserting said plate into said opening, causing said barbs to contract and subsequently expand as they pass through said opening.

2. The bracket claimed in claim 1 wherein said article is a towel roll holder.

3. A holder for supporting a roll of material to the side of an appliance at an elongated crack between a side wall of said appliance and the top wall of said appliance, said holder comprising:
   a first means to support said roll of material;
   a second means to attach said first means to said appliance comprising a bracket fixed to said first means, said bracket comprising an elongated plate adapted to slide within said elongated crack, said plate including a plurality of barbs, said plurality of said barbs spaced along said plate at a plurality of different distances from said first means, said barbs having a first edge attached to said plate and a second edge extending away from said plate, said barbs being flexible and resilient;

whereby said plate is attached to said appliance by inserting said plate into said crack, causing said barbs to contract and subsequently expand as they pass through said crack.

4. The holder claimed in claim 3 further comprising a first column of downwardly extending barbs, a second column of upwardly extending barbs, the barbs in said first column aligned with the barbs in said second column.

5. The holder claimed in claim 1 further comprising a first column of said barbs and a second column of said barbs wherein said columns extend away from said first means.

* * * * *